United States Patent [19]

Hays et al.

[11] Patent Number: 4,563,334

[45] Date of Patent: Jan. 7, 1986

[54] CATALYTIC CRACKING UNIT

[75] Inventors: George E. Hays; Richard K. Young; Richard H. Nielsen, all of Bartlesville, Okla.

[73] Assignee: Phillips Petroleum Company, Bartlesville, Okla.

[21] Appl. No.: 557,551

[22] Filed: Dec. 2, 1983

[51] Int. Cl.[4] .............................................. B01J 8/18
[52] U.S. Cl. .................................... 422/140; 208/157; 239/428; 422/145; 422/214
[58] Field of Search .............. 422/140, 144, 145, 146, 422/205, 213, 214; 208/127, 157, 158, 159; 239/427.5, 428, 431, 558, 132.3, 132.5, 432; 261/78 A

[56] References Cited

U.S. PATENT DOCUMENTS

| | | | |
|---|---|---|---|
| 2,654,658 | 10/1953 | Marshall | 422/140 |
| 2,937,988 | 5/1960 | Polack | 208/158 |
| 2,985,517 | 5/1961 | Harper | 422/144 |
| 3,239,205 | 3/1966 | Metz | 239/132.3 |
| 3,473,530 | 10/1969 | Urbanowitz | 261/78 A |
| 4,345,992 | 8/1982 | Washer et al. | 208/153 X |

Primary Examiner—Barry S. Richman
Assistant Examiner—William R. Johnson
Attorney, Agent, or Firm—French and Doescher

[57] ABSTRACT

The walls surrounding the atomization chamber in a fluidized catalytic cracking unit where the cracking catalyst surrounds the atomization chamber are cooled by a flow of cooling fluid and baffles to cause the cooling fluid to flow in generally annular streams with crossflow between the annular streams being in a generally radially inwardly direction.

10 Claims, 3 Drawing Figures

CATALYTIC CRACKING UNIT

Background of the Invention

In one aspect, the invention relates to a catalytic cracking unit. In another aspect, the invention relates to feeding materials to the riser or transfer line in a fluid catalytic cracking unit.

High boiling oils are difficult to catalytically crack to gasoline range product in existing catalytic cracking operations. There are several reasons for this. The deposition of large amounts of coke on the catalyst will frequently bring the unit up to its coke burning capacity. Coke precursors are more abundant in high boiling oils. Coke laydown is also caused by the deposition of metals on the cracking catalyst that increase the coking tendencies of the catalyst. The troublesome metals become concentrated in the high boiling oils. Coke laydown to a large extent is also influenced by poor vaporization of the oil prior to contact with the catalyst. High boiling oils are difficult to vaporize. Poor mixing between the cracking catalyst and oil feedstock also contributes to coke laydown on the catalyst, as poor mixing can lead to localized high catalyst:oil ratios and overcracking.

Heavy oils include heavy gas oils which generally boil from about 600° F. to 1200° F., and components such as topped crudes and residuum which frequently have an initial boiling point in excess of 850° F. and an end boiling point in excess of 1200° F. Generally speaking, heavy oils will have an initial boiling point in excess of 500° F. and a 90% overhead point in excess of 1000° F. Heavy gas oils and residuums are especially difficult to crack to valuable products because their boiling point makes satisfactory vaporization very difficult, their viscosity complicates handling and further complicates vaporization, metal contaminant concentration is usually quite high, the hydrogen:carbon ratio is quite low and the concentration of carbon producing components such as polycyclic aromatics, asphaltenes and the like is very high. Feeds which contain components which have a boiling point in excess of 1050° F.+ are generally considered to be very poor fluid catalytic cracking feeds due to poor conversion to gasoline and lighter components, high coke production and excessive temperature levels in the regenerator.

Heavy oils can be successfully cracked to desirable products where they have been vaporized prior to contact with the catalyst and the catalyst:oil ratio is carefully controlled. With conventional feeds, vaporization is achieved by radiant energy transfer from the hot cracking catalyst to the feed droplets. This type of vaporization mechanism is satisfactory for oils boiling below thermal cracking temperatures which commence at about 850° F. For heavy oils, however, vaporization by radiant energy transfer is unsatisfactory due to the onset of thermal cracking and coke formation prior to complete vaporization. Coke laydown is worsened where liquid oil strikes the hot catalyst particles. It would be clearly desirable to provide an apparatus and process to mitigate contact between hot catalyst and liquid oil feed in a catalytic cracking unit.

It has been proposed to atomize the cracking feedstock in an atomization chamber prior to admixing the atomized feedstock with cracking catalyst. In one arrangement for accomplishing this, the cracking catalyst is flowed annularly around the atomization zone. Heat penetration from the cracking catalyst through the walls of the atomization zone could cause undesirable coke formation on the walls of the atomization zone. An apparatus to provide for cooling the walls defining the atomization zone and a method for cooling the walls would clearly be very desirable.

OBJECTS OF THE INVENTION

It is an object of this invention to provide an apparatus and a method for cooling the walls of the atomization chamber in a catalytic cracking unit.

SUMMARY OF THE INVENTION

In one aspect, there is provided a cartridge assembly suitable for deployment in a catalytic cracking unit. The assembly comprises an inner tubular wall member having a first end and a second end. An outer tubular wall member having a first end and a second end is positioned generally concentrically around the inner tubular wall member to form an annulus between the inner tube wall member and the outer tube wall member. An end wall member connects the first end of the inner wall member to the first end of the outer wall member. A first closure is positioned across the second end of the inner wall member and a second closure is positioned across the second end of the outer wall member. A first tubular baffle having apertures therethrough is positioned in the annulus between the inner wall member and the outer wall member. A second tubular baffle having apertures through it is positioned in the annulus between the inner wall member and the outer wall member. The second tubular baffle is positioned between the first tubular baffle and the inner wall member. The tubular baffles provide for generally longitudinal flow of cooling fluid in the annulus between the atomization chamber and the hot cracking catalyst and can prevent or mitigate coke deposits from occurring on the wall of the atomization chamber.

In another aspect of the present invention, there is provided a method for cooling the body of an atomization nozzle having an atomization chamber therein, an upstream end and a downstream end. The method comprises introducing the cooling fluid into the body of the nozzle adjacent the downstream end of the nozzle. The cooling fluid is flowed in an upstream direction in a stream having a generally annular cross section around the atomization chamber. The inside wall of the atomization chamber can thus be sufficiently cooled to avoid carbonizing liquid feedstock which strikes it.

DETAILED DESCRIPTION OF THE INVENTION

Figure 1:
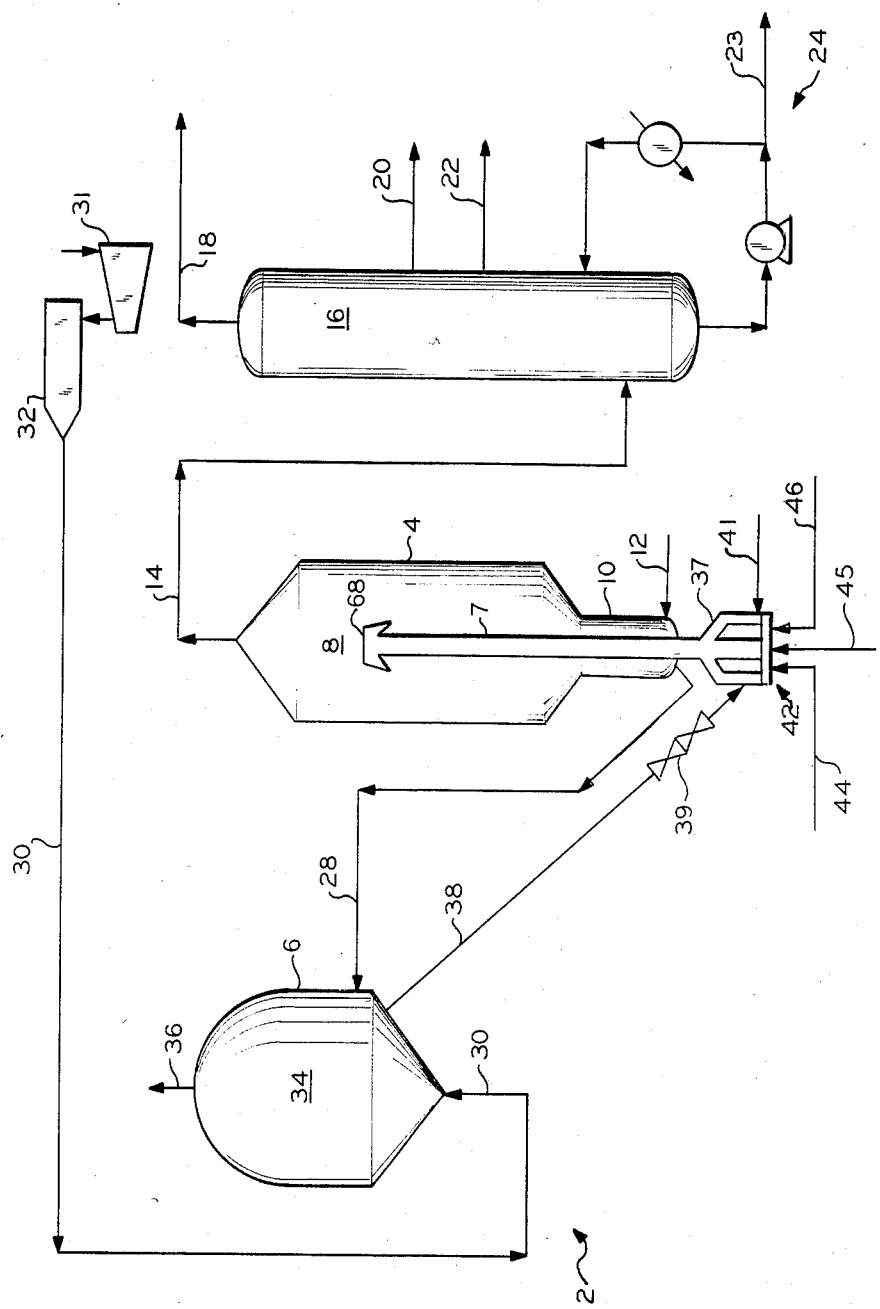
FIG. 1 illustrates schematically certain features of one type of catalytic cracking unit.

With reference to FIG. 1, one type of fluid catalytic cracking unit (FCCU) 2 comprises a reactor 4 and a regenerator 6. The reactor 4 comprises a riser reactor or transfer line reactor 7, a catalyst/product separation zone 8 which usually contains several cyclone separators, and a stripping section or zone 10 in which gas, usually steam such as introduced from line 12, strips entrained hydrocarbon from the coked catalyst. Overhead product from the separation zone 8 is conveyed via line 14 to a separation zone 16 such as the main fractionator where it is separated, for example, into light hydrocarbons which are withdrawn from the zone 16 by the line 18, gasoline range liquids which are withdrawn by the line 20, distillates which are withdrawn by the line 22, and slurry oils, cycle oils, unreacted feed and the like which can be yielded in line 23 or recycled in the recycle means 24 as required.

After being stripped in the zone 10, the cracking catalyst is conveyed from the zone 10 to the regenerator 6 by line 28 for coke burnoff. In the regenerator 6, oxygen containing gas is introduced by a line 30 which is connected to a source of oxygen containing gas such as the air compressor 31 and heater 32. Coke deposits are burned from the catalyst in the regenerator 6 forming an effluent gas which is separated from the catalyst in a separation portion 34 of the regenerator 6 which usually contains a plurality of cyclone separators. These flue gases are withdrawn from the regenerator 6 by the line 36. Hot regenerated catalyst passes from the regenerator 6 to a lift pot 37 at the lower end of the riser reactor 7 by line 38, which provides a source of hot cracking catalyst particles for the riser reactor.

The catalyst flow rate through the cracking unit is controlled by valves 39 which are positioned in the line 38, preferably in a vertical portion thereof.

In the lift pot 37, catalyst from the line 38 is fluidized with a fluidizing gas, usually steam, which is introduced into the lift pot 37 by line 41. The oil feedstock is introduced into the lift pot 37 via a nozzle cartridge assembly 42 which preferably emits a fine mist axially into the riser or transfer line reactor at the lower end thereof. A line 44 connects the nozzle cartridge assembly 42 with a source of heavy oil feedstock in the most preferred embodiment, although the invention can also be used to crack exclusively light oils if desired. A line 45 can then connect the nozzle cartridge assembly with a source of light gas oil, or the like. Atomizing gas such as steam can be added to the nozzle cartridge assembly 42 by line 46 which connects the nozzle cartridge assembly to a steam source.

The operating conditions for the riser reactor 7 and regenerator 6 can be conventional. Usually, the temperature in the riser reactor 7 will be in the range of from about 850° to about 1050° F. The oil is usually admixed with steam at a weight ratio of oil to steam in the range of from about 6:1 to about 25:1. A catalyst oil weight ratio employed in the riser reactor 7 is generally in the range of from about 2:1 to about 30:1, usually between about 3:1 and about 15:1. Pressure in the riser reactor 7 is usually between about 15 and about 60 psia (pounds per square inch absolute). The cracking catalyst particles generally have a size in the range of from about 20 to about 200 microns, usually between about 40 and 80 microns. Flow velocity upward in the vertical section of the riser reactor is generally from about 10 to 30 feet per second in the lower portions and up to between about 40 and about 120 feet per second in the upper portions. The contact time between the catalyst and oil in the riser reactor is generally in the range of from about 1 to about 4 seconds, usually from 1.5 to about 3 seconds where the oil is injected into the bottom of the riser. The regenerator is operated at a temperature typically in the range of from about 1100° to about 1500° F. and is ordinarily provided with sufficient oxygen containing gas to reduce the coke on the catalyst to a level of about 0.5 weight percent or less, preferably less than 0.1 weight percent.

Catalysts suitable for catalytic cracking includes silica alumina or silica magnesia synthetic microspheres or ground gels and various natural clay-type or synthetic gel-type catalysts. Most preferably, fluidizable zeolite-containing cracking catalysts are employed. Such catalysts can contain from about 2 to about 20 percent based on total weight of zeolitic material, such as Y-zeolite, dispersed in a silica alumina matrix and have an equilibrium B.E.T. surface area in the range of 25–250 $m^2/g$ and a particle size chiefly in the range of 40 to 80 microns.

Figure 2:
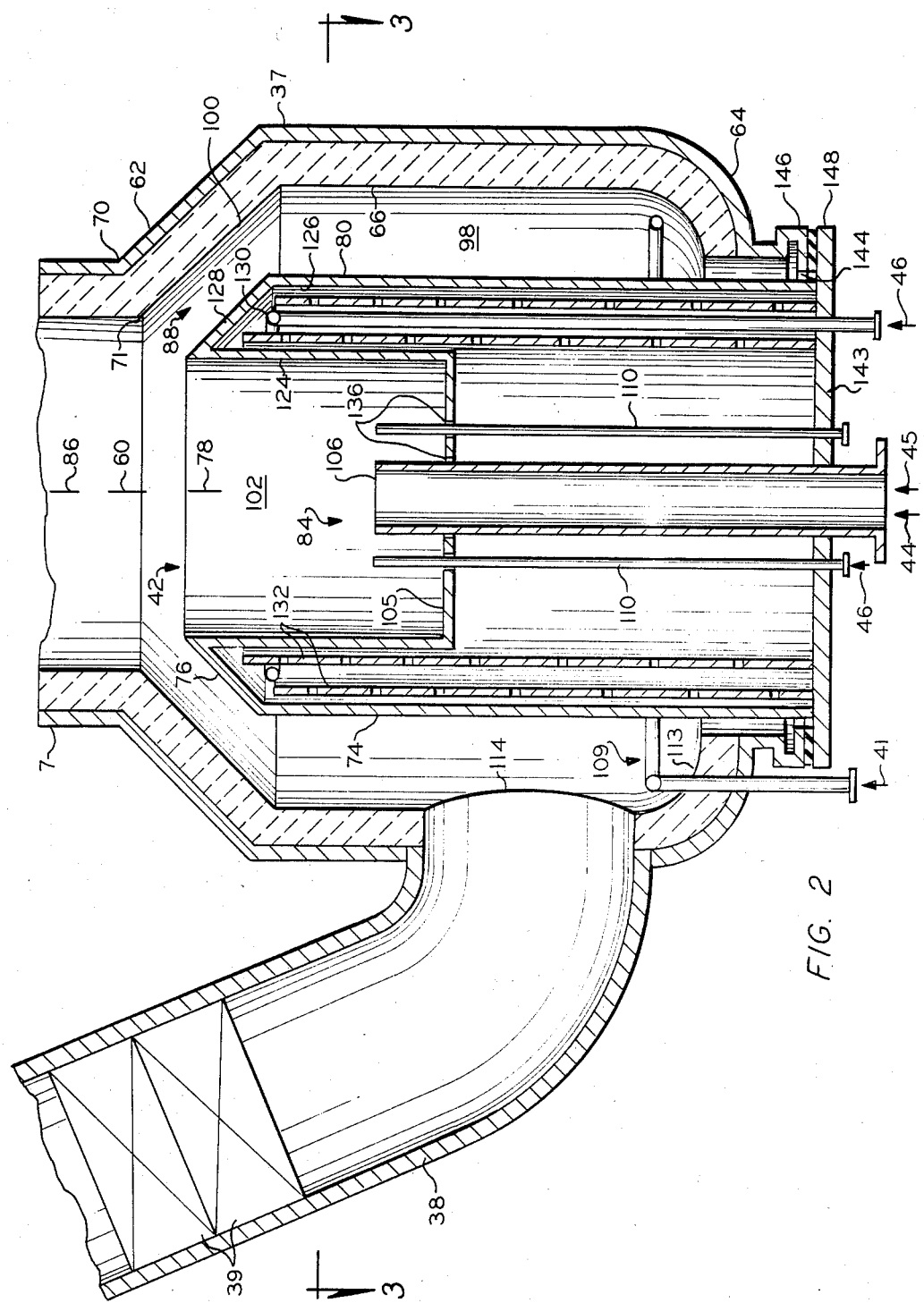
FIG. 2 illustrates schematically certain features of an embodiment of the present invention usefully employed in the system of FIG. 1.
Figure 3:
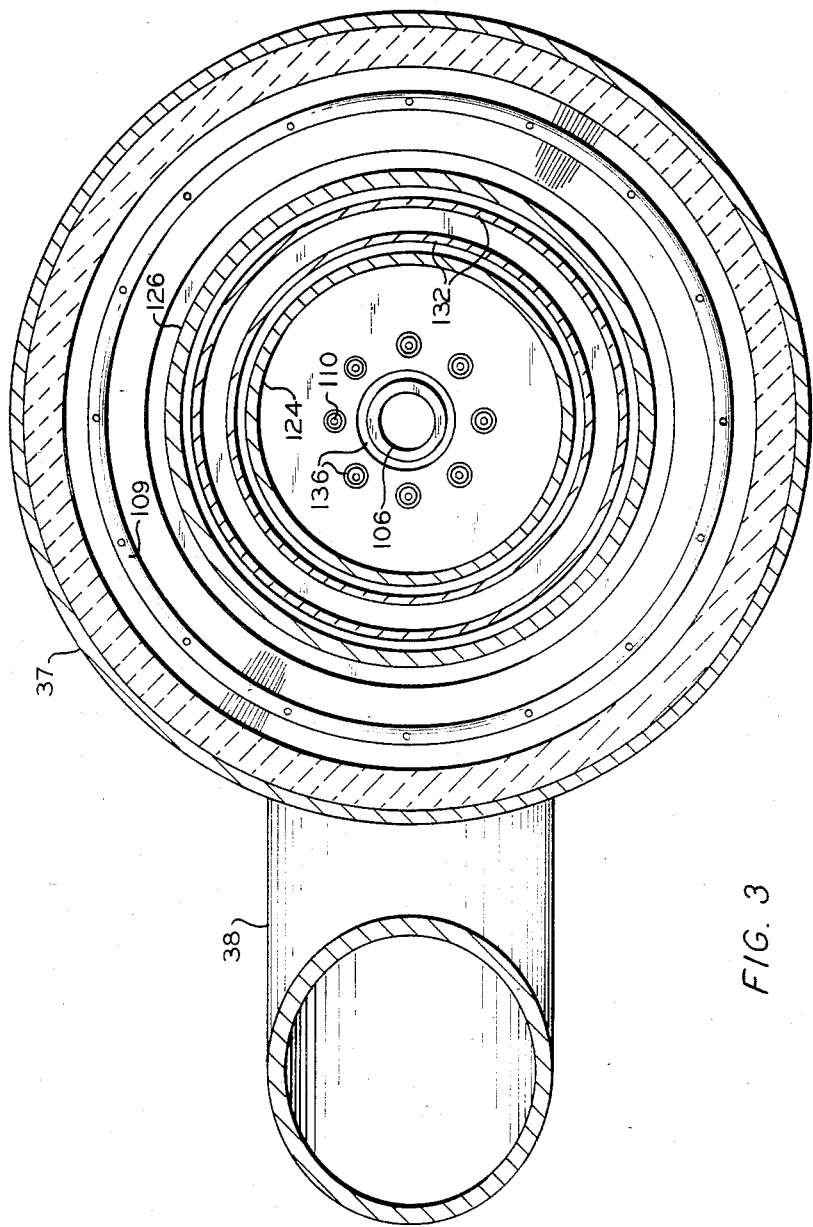
FIG. 3 schematically illustrates a cross section of the apparatus shown in FIG. 2 as would be seen when viewed along indicated lines 3—3.

Referring now particularly to FIGS. 2 and 3, the catalyst lift pot 37 has a longitudinal axis 60, an upper end 62, a lower end 64 and an interior surface 66. Usually, the interior surface 66 will be formed from refractory to resist rapid erosion from the hot catalyst. The riser reactor 7 has an upper end 68 in FIG. 1, a lower end 70 in FIG. 2, with the lower end 70 being connected to the upper end 62 of the lift pot. The lower end 70 of the riser reactor 7 forms a mouth 71 to the riser reactor. The nozzle assembly 42 comprises a tubular member 74 extending into the lift pot 37 from the lower end 64 of the lift pot. The tubular member 74 has an upper end 76, a longitudinal axis 78, and an exterior surface 80. A means 84 is provided for introducing a first material generally axially into the lower end 70 of the riser reactor 7, along a longitudinal axis 86 thereof. A means 88 is provided for introducing a second material into the lower end 70 of the riser reactor 7 from at least substantially the entire circumference of the mouth 71. Preferably, the first material comprises an oil feedstock and the means 84 for introducing the first material into the riser reactor 7 is connected to a source of oil feedstock such as via lines 44 and 45. The second material comprises a hot fluidizable cracking catalyst and the means 88 for introducing the second material into the lower portion 70 of the riser 7 is connected to a source of hot fluidizable cracking catalyst such as the regenerator 6 such as via the line 38.

Preferably, the exterior surface 80 of the tubular member 74 is generally cylindrical in shape, although other shapes, such as frustoconical, would be very suitable. The interior surface 66 of the catalyst lift pot 37 also has a portion which is generally cylindrical and is centered about the axis 60. In this manner, a catalyst lift chamber 98 is formed between the exterior surface 80 of the tubular member 74 and the interior surface 66 of the lift pot. Preferably, the catalyst lift chamber 98 has a generally annular cross section. The upper end 62 of the catalyst lift pot 37 is preferably formed by a wall 100 defining an inside surface which connects the generally cylindrical interior surface 66 of the catalyst lift pot 37 with the mouth 71 of the riser reactor.

For ease of fabrication and good results, it is preferred that the inside surface of the wall 100 at the upper end 62 of the lift pot 37 connecting the generally cylindrical interior surface 66 of the catalyst lift pot 37 with the lower end 70 of the riser reactor 7 is generally frustoconical in shape. The inside surface of wall 100 preferably converges toward the longitudinal axis 86 of the riser reactor 7 at an angle as measured between the axis 86 and the inside surface of the wall 100 of between about 15 degrees and about 80 degrees. The surface 128 at the upper end 76 of the tubular member 74 is also preferably generally frustoconically shaped and converges toward the longitudinal axis 86 of the riser reactor 7 at an angle as measured between the longitudinal axis 86 and the surface 96 of between about 15 degrees and about 80 degrees. Preferably, the surfaces 128 and 100 converge toward the longitudinal axis 86 of the riser reactor 7 at an angle which is in the range of from about 30 degrees to about 75 degrees.

For atomization and vaporization of heavy oil feeds, the inside of the tubular member 74 preferably forms a generally cylindrical atomization chamber 102. The length of the atomization chamber 102 is preferably sufficient to provide a uniform velocity across the chamber. In practice, the desirable length as measured longitudinally for the chamber 102 will depend on steam and oil rates, oil viscosity, oil boiling point, nozzle type, and other parameters. Generally the length of the chamber 102 between the upper end 76 of the tubular member 74 and an atomization chamber end wall 105 spaced apart from the upper end 76 of the tubular member 74 is sufficient to provide the chamber 102 with a length to diameter ratio which is in the range of from about 1:10 to about 10:1, usually in the range of from about 1:3 to about 3:1. Pipes and tubular members preferably extend through the end wall 105 and empty into the atomization chamber 102 for supplying oil and atomization fluid into the chamber 102. Preferably, a central pipe 106 extends through the end wall 105 along the axis 78 thereof and empties into the atomization chamber 102. A plurality of tubular members 110 can be circumferentially spaced apart around the central pipe 106 for emptying into the atomization chamber 102. Dispersal gas, usually steam, can be added into the chamber 102 through the tubular members 110. To achieve this, a source of atomizing fluid 46 can be connected to the tubular members 110.

Preferably, the cracking catalyst is fluidized prior to being mixed with the oil feed. For catalyst aeration or fluidization a means 109 is positioned in the catalyst lift chamber 98 for distributing a fluidizing gas such as steam from steam source 41 into the catalyst lift chamber adjacent a lower end 113 of the catalyst lift chamber 98. The line 38 preferably empties into the lift pot 37 through a port 114 through the sidewall of the lift pot opening between the means 109 and the upper end 62 of the lift pot. The means 109 preferably distributes fluidizing gas in the lower portion of lift pot to start vertically upward flow of the cracking catalyst. Usually, the means 109 will be formed from an annular distributor having a sidewall with a plurality of ports therethrough which connects its interior with circumferentially spaced apart positions in the catalyst lift chamber 98. The ports through the sidewall of the annular distributor constituting the means 109 can be oriented downwardly or upwardly to lift the catalyst introduced into the catalyst lift chamber 98 via port 114 to mouth 71 of the riser-reactor 7.

To prevent or mitigate coking on the inside of the tubular member 74, it is desirable to hollow out the sidewall of the tubular member 74 such as by forming the tubular member 74 by an inner wall member 124, an outer wall member 126 and an end wall member 128. The end wall 105 of the atomization chamber 102 is defined by a closure across the inside diameter of the inner wall member 124 of the tubular member 74. The biggest advantage to hollowing out the sidewall of the tubular member 74 instead of forming it from a solid material such as refractory is that it can be cooled by a flow of cooling fluid. For example, a source of steam 46 can be connected to the annulus between the inner wall member 124 and the outer wall member 126 so that cooling fluid flows through the annulus. One manner for doing this is to provide an annular fluid distributor 130 having a sidewall and a plurality of ports through its sidewall at spaced apart positions along its length connected to the fluid source 46 and positioned in the annulus between the inner wall 124 and the outer wall 126 at a position closely adjacent the end wall member 128. To reduce heat penetration from the catalyst lift chamber 98 to the atomization chamber 102, one or more radiation shielding members, preferably tubular baffles 132 can be positioned between the inner wall member 124 and the outer wall member 126. The radiation shielding members 132 provide radiation shielding between the wall members to reduce heat penetration into the atomization chamber 102 and the possibility of coke buildup. When the radiation shielding members 132 are in the form of tubular baffles they extend circumferentially around and longitudinally through the annulus between the inner and outer wall members and this arrangement is presently preferred. The tubular baffles 132 are provided with apertures which are preferably radially nonaligned as between adjacent baffles (the apertures can be spaced radially and/or longitudinally) so as to prevent or mitigate heat penetration by radiation. Other types of radiation shielding, such as bronze turnings, raschig rings and the like can be employed if desired. The cooling fluid introduced into the annulus between the inner wall member 124 and the outer wall member 126 can be introduced or exhausted into the riser if desired, such as through a plurality of ports 136 which extend through the end wall 105 defining the lower end of the atomization chamber 102.

Generally speaking, sufficient apertures are provided to account for between about 1 and 10% of the sidewall area of each of the tubular baffles. The baffles are positioned so that the apertures are in substantial radial misalignment so that radiant energy cannot pass from the outer wall member to the inner wall member of the oil nozzle without being substantially impeded by at least one baffle. Cooling fluid flowing radially inward through the apertures can be emitted into the atomization chamber if desired through ports provided in the closure across the second end of the inner tubular member. If desired, the cooling fluid can be exhausted at the upstream end of the oil nozzle cartridge assembly through a port not shown. The tubular baffles are preferably mounted to an end closure 143 which closes the upstream end of outer wall 126 of the cartridge assembly. Where the inner tubular wall member 124 protrudes past the end of the outer tubular wall member 126, it is preferred that the inner tubular baffle 132 protrude past the outer tubular baffle 132 in order to reduce radiation reaching the inner wall member 124 from through the end wall member 128.

For maintenance purposes, it is very desirable that the assembly 42 be removable as a unit. One manner of providing for this is to form the lift pot 37 with a port 144 at its lower end adapted for receiving the generally cylindrical exterior surface 80 of the tubular member. A generally annular flange 146 is positioned around the port. The generally cylindrical exterior surface 80 of the tubular member is provided with a generally annular flange 148 mounted thereon sealingly contacting the generally annular flange 146 at the lower end of the lift pot, generally via a gasket.

According to certain further aspects of the present invention, there is provided a method for mixing a fluidized particulate catalyst and a liquid oil feedstock. The method comprises introducing one of the liquid oil feedstock and the fluidized particulate catalyst generally axially into the mouth of a riser reactor, and introducing the other of the liquid oil feedstock and the fluidized particulate catalyst into the mouth of the riser from substantially the entire circumference of the mouth of the riser. Preferably, the liquid oil feedstock is introduced generally axially into the mouth of the riser and the fluidized particulate catalyst is introduced into the mouth of the riser from substantially the entire circumference of the mouth of the riser. Usually, each of the liquid oil feedstock and the particulate catalyst will be in admixture with atomizing and fluidizing gas respectively, usually steam in both instances. In order to reduce the probability of liquid oil droplets from striking hot cracking catalyst particles, it is desirable that the liquid oil feedstock and catalyst particles merge together at about the same velocity. Therefore, the particulate catalyst is preferably introduced into the riser with an axial velocity component which is about the same as the axial velocity of the liquid oil feedstock, where axial refers to the axis of the riser or transfer line, which is preferably vertically oriented. In this manner, catalyst slippage for velocity difference between fluidizing gas and catalyst particles, at the point of mixing with the feedstock, that is, substantial slippage prior to vaporization of the feed, can be substantially prevented.

Preferably, the particulate catalyst comprises a fluid catalytic cracking catalyst which will have a particle size primarily in the range of from about 20 to about 200 microns, usually in the range of from about 40 to about 80 microns. The liquid oil feedstock will generally comprise a petroleum oil having boiling point in the range of from about 600° F. to about 1200° + F. and be introduced into the riser so as to provide a catalyst:oil weight ratio in the range of from about 2:1 to about 20:1. The liquid oil feedstock is preferably introduced generally axially into the mouth of the riser from a generally cylindrical atomization chamber positioned in general axial alignment with the riser and the fluidized cracking catalyst is usually introduced into the mouth of the riser from a catalyst lift chamber annularly positioned around the atomization chamber and physically separated from the atomization chamber. The catalyst lift chamber empties into the mouth of the riser along the circumference of the mouth 71. In this manner, the oil feedstock can be introduced into the mouth of the riser in atomized form with the droplet size being less than 1000 microns, preferably principally in the range of from about 5 to about 500 microns, having been atomized by being sprayed into an atomization chamber axially aligned with the mouth of the riser. The fluidized cracking catalyst is flowed into the stream of atomized oil feedstock with a substantial radially inward velocity component from the periphery of the stream. Preferably, the fluidized cracking catalyst enters the stream of atomized oil feedstock at an acute angle of between about 45 degrees and about near 90 degrees with respect to the flow axis of the atomized oil feedstock. Steam can be injected into the generally annularly shaped cloud of fluidized cracking catalyst slightly upstream of its entry into the mouth by a steam ring not shown to both dilute and impart a radially inward velocity component to the cracking catalyst, since steam injection at this point can aid in forming a vortex of cracking catalyst particles and atomized oil feedstock traveling up the riser. By accelerating the catalyst in three stages, a uniform dilute phase of catalyst can be achieved. For example, the catalyst can be accelerated to 3–10 fps by the bottom steam ring, 5–15 fps by the top steam ring (not shown) and 10–25 fps by the annular venturi.

Generally, the cracking catalyst will be introduced into the catalyst lift chamber at a temperature in the range of from about 1000° F. to about 1700° F. and the atomization and fluidization steam will be at a temperature in the range of from about 300° F. to about 1000° F. The oil will typically have been preheated to a temperature in the range of from about 200° F. to about 800° F. To reduce the possibility of coke formations on the inside walls of the atomization chamber, the atomization chamber and catalyst lift chamber can be physically separated by a hollowed out wall and a cooling fluid circulated through the hollow wall. If desired, at least a portion of the cooling fluid can be withdrawn from the hollow wall and at least a portion of it injected into the atomization chamber. Preferably, the cooling fluid comprises steam in which event a stream of steam is injected into the atomization chamber separate from the liquid oil feedstock. If desired, a separate steam stream can be introduced into the atomization chamber alternatively or in addition to the steam entering the atomization chamber from the hollowed out wall. For good distribution of the separate steam streams, they can be introduced into the atomization chamber at circumferentially spaced apart positions in the chamber.

At least two radiation shield members can be positioned in the hollow wall and the cooling fluid circulated around the radiation shield members to further reduce heat leakage through from the catalyst lift chamber into the atomization zone. The radiation shield members are preferably formed by the tubular baffles as previously described. The cooling fluid preferably comprises a gas such as steam. Where two baffles are present, the annular stream of cooling fluid which is circulated in an upstream direction in the nozzle body with respect to oil and catalyst flows is divided into a first annular portion, a second annular portion and a third annular portion by the two baffles. The first annular portion flows adjacent the outside of the nozzle, the second annular portion flows adjacent the inside of the nozzle, and the third annular portion flows between the first annular portion and the second annular portion. Where the tubular baffles have apertures, a fraction of the contents of the stream in the first annular portion will flow into the third annular portion and a fraction of the third annular portion stream will flow into the second annular portion. The purpose of the apertures is to prevent stagnation of the streams. Because the stream flowing adjacent the outer wall will absorb more heat than the middle stream which in turn will absorb more heat than the inner stream, expansion will cause the streams to flow radially inward through the apertures in the tubular baffles. The steam thus heated can be flowed into the atomization chamber if desired or withdrawn from the unit. The apertures form generally radially inwardly directed paths through the first baffle and the second baffle and the paths through the second baffle which separates the third generally annular portion of the stream from the second generally annular portion are generally offset from the apertures through the first baffle which separate the first generally annular portion of the stream from the third generally annular portion.

Radiation and heat penetration to the inner tubular wall member, where coking could occur, is thus held to a temperature below that at which coking would commence.

The invention is illustrated by the following example.

EXAMPLE

The following illustrates how the invention might be used in a commercial unit. Using the equipment described in FIGS. 1, 2, and 3 the following specific conditions can be employed.

| Item | | |
|---|---|---|
| (34) Regenerator diameter feet-inches (I.D.) | | 45'2" |
| (34) Regenerator length feet-inches | | 67'8" |
| (8) Reactor (disengager) diameter feet-inches (I.D.) | | 26'0" |
| (8) Reactor (disengager) length feet overall | | 54'0" |
| (7) Reactor riser diameter I.D. inches | | 42" |
| (7) Reactor riser height feet-inches | | 88'6" |
| (37) Lift pot diameter feet-inches | | 7'0" |
| (37) Lift pot height overall feet-inches | | 7'11" |
| (38) Catalyst conduit diameter (I.D.) feet-inches | | 2'2" |
| (39) Catalyst slide valve diameter (I.D.) feet-inches | | 2'6" |
| Operating Conditions | Regenerator | Disengager | Reactor |
| Outlet temperature °F. | 1298 | 928 | |
| Dilute phase temperature °F. | 1312 | 900 | |
| Top pressure psia | 19.7 | 24.2 | |
| Riser inlet temperature °F. | | | 1011 |
| Riser feed temperature °F. | | | 702 |
| Riser out temperature °F. | | | 951 |
| Reactor stripper temperature °F. | | 950 | |
| Stripping steam lb/hr | | 5500 | |
| Stripping steam lb/ton catalyst | | 7.2 | |
| Riser cat/oil ratio | | | 4.3 |
| Riser Velocity feet/sec | | | 50 |
| Residence time seconds | | | 1.8 |
| Catalyst circulation tons/min | | | 12.7 |
| Total regenerator air (SCFM) | 85,300 | | |
| Air blower discharge temperature °F. | 310 | | |
| Air blower discharge pressure psia | 38 | | |
| Fresh Feed Oil Charge Volumes and Temperatures BPD, °API °F. | BPD | °API | °F. |
| Virgin gas oil | 10,000 | 32.8 | 750 |
| Heavy cycle oil (nozzle not shown) | 7,200 | 20.3 | 780 |
| Topped crude (nozzle not shown) | 8,000 | 14.0 | 800 |
| Reslurry oil (nozzle not shown) | 2,400 | 10.9 | 680 |
| Precipitator backwash (nozzle not shown) | 1,200 | 10.8 | 480 |
| Total fresh feed | 28,800 | — | — |
| Steam, 125 psig, 500° F. | | | |
| To V. Gas oil preheater lb/hr | 4,000 | | |
| To slurry nozzle lb/hr | 3,000 | | |
| All other cartridge stm lb/hr | 11,000 | | |
| Total steam usage | 18,000 | | |
| Lift Pot | | | |
| Item | Dimension | | |
| (109) Two 3-inch sch. 160 304 S S. steam rings with 21 3/16 diameter steam holes | 5 ft-6 in OD | | |
| (42) Cartridge, outside refractory diameter overall height | 4 ft-4 in<br>9 ft-5¼ in | | |
| (102) Inside cartridge diameter (refractory) chamber | 2 ft-10 in | | |
| (102) Length of chamber | 3 ft-4 in | | |
| (106) 1 Virgin gas oil feed pipe nom sch 80 | 10 in Dia. | | |
| (66) Lift pot interior refractory surface | 6 ft 3 in I.D. | | |
| (70) Lower end of riser interior refractory I.D. | 42 in | | |
| (76) Upper end of cartridge rounded with ½ inch radius, with ⅛ inch outer layer of Stellite #1 over a ⅛ inch inner layer of Stellite #6 over a nosing bar | As described | | |
| (88) Catalyst acceleration zone defined between surfaces 128 and 100 | 4 to 5 inches between surface. Throat measures about 600 inches². Surfaces converge toward axis at about a 45° angle. | | |
| (98) Catalyst lift chamber, annular width with annulus circumferential 360° around cartridge | 11½ in | | |
| (110) Dispersal steam pipes of 1 to 1½ inch nominal pipe diameter. | | | |
| (130) Perforated steam ring 2 inch sch. 80, 3 feet 7 inches in diameter | | | |
| (132) 2 Radiation shielding baffle members, perforated ⅜ inch thick steel plates | | | |

-continued cylindrical shaped, ⅛ inch diameter holes,
4-inch center line distance between holes,
plates are 1 inch apart, holes are misaligned (148) 5 feet-5 inches diameter flange 4 inches
thick carbon steel with 60-1⅜ inch
diameter holes on a 60 inch bolt circle

What is claimed is:

1. Apparatus comprising
   (a) an inner tubular wall member having a first end and a second end;
   (b) an outer tubular wall member generally concentrically positioned around the inner tubular wall member and having a first end and a second end, an annulus being defined between the inner wall member and the outer wall member;
   (c) an end wall member connecting the first end of the inner wall member to the first end of the outer wall member;
   (d) a closure across the second end of the inner tubular wall member, an atomization chamber being defined between the first end of the inner tubular wall member and the closure;
   (e) a first tubular baffle having a first end and a second end and apertures therethrough and wherein the first baffle is positioned in the annulus between the inner wall member and the outer wall member;
   (f) a second tubular baffle having a first end and a second end and apertures therethrough positioned in the annulus between the inner wall member and the outer wall member between the first tubular baffle and the inner wall member,
   (g) a closure across the second end of the outer tubular wall member; and
   (h) means extending through the closure across the second end of the inner tubular wall member for supplying an atomizing fluid to the atomization chamber.

2. Apparatus as in claim 1 wherein the apertures in each of the baffles are in radial misalignment so that radiant energy cannot pass from the outer wall member to the inner wall member without being substantially impeded by a baffle.

3. Apparatus as in claim 2 further comprising a source of cooling fluid and means for supplying said cooling fluid into the annulus between the inner wall member and the outer wall member at a position adjacent to the end wall member which connects the inner wall member and the outer wall member;
   wherein the first tubular baffle and the second tubular baffle are attached to the closure across the second end of the outer wall member.

4. Apparatus as in claim 3 wherein the apertures are provided in from about 1 to about 10 percent of the sidewall area of each of said tubular baffles.

5. Apparatus as in claim 3 wherein the first end of the inner wall member extends past the first end of the outer wall member and the first end of the second generally tubular baffle extends beyond the first end of the first generally tubular baffle.

6. Apparatus as in claim 3 wherein the means for supplying cooling fluid comprises a generally annular distributor positioned near the end wall member, wherein the annular distributor has a sidewall and a plurality of ports through its sidewall at spaced apart positions along its length and is connected to the source of cooling fluid.

7. Apparatus as in claim 6 wherein the closure across the second end of the inner tubular member has a plurality of ports through it to establish a flow path between the means for supplying cooling fluid and the inside of the inner tubular member.

8. Apparatus comprising:
   a catalyst lift pot having a longitudinal axis, an upper end, a lower end and an interior surface;
   a riser reactor having an upper end and a lower end with the lower end connected to the upper end of the lift pot;
   a tubular member extending into the lift pot from the lower end of the lift pot, said tubular member comprising
   an inner tubular wall member having a first end and a second end;
   an outer tubular wall member generally concentrically positioned around the inner tubular wall member and having a first end and a second end, an annulus being defined between the inner wall member and the outer wall member;
   an end wall member connecting the first end of the inner wall member to the first end of the outer wall member;
   a closure across the second end of the inner wall member, an atomization chamber being defined inside the inner tubular member between the first end and the second end;
   a first tubular baffle having apertures therethrough positioned in the annulus between the inner wall member and the outer wall member; and
   a second tubular baffle having apertures therethrough positioned in the annulus between the inner wall member and the outer wall member between the first tubular baffle and the inner wall member;
   the outer tubular wall member having a generally cylindrical exterior surface and the catalyst lift pot having a generally cylindrical interior surface generally concentric with the exterior surface of the outer tubular wall member to form a catalyst lift chamber of generally annular cross-section between the exterior surface of the outer tubular wall member and the interior surface of the lift pot;
   a means extending through the end wall member of the tubular member for introducing an oil feedstock into the atomization chamber for atomization therein and flow generally longitudinally into the lower end of the riser reactor; and
   a means for introducing a hot fluidizable cracking catalyst into the catalyst lift chamber.

9. An apparatus as in claim 8 wherein the aperatures within the tubular baffles are in radial misalignment so that radiant energy cannot pass from the catalyst lift chamber to an oil feedstock atomization chamber defined inside of the inner tubular wall member without being substantially impeded by a tubular baffle.

10. Apparatus as in claim 9 wherein the aperatures are provided and from about 1 to about 10 percent of the sidewall area of each of said tubular baffles.

* * * * *